US005778359A

United States Patent [19]
Stent

[11] Patent Number: 5,778,359
[45] Date of Patent: Jul. 7, 1998

[54] SYSTEM AND METHOD FOR DETERMINING AND VERIFYING A FILE RECORD FORMAT BASED UPON FILE CHARACTERISTICS

[75] Inventor: Robert J. Stent, Westford, Mass.

[73] Assignee: Davox Corporation, Westford, Mass.

[21] Appl. No.: 634,471

[22] Filed: Apr. 18, 1996

[51] Int. Cl.[6] ............................................. G06F 9/30
[52] U.S. Cl. ...................... 707/4; 707/104; 707/200; 707/384; 707/523
[58] Field of Search ......................... 395/615, 616, 395/604, 707, 785, 200.19; 707/4, 104, 200, 523, 384

[56] References Cited

U.S. PATENT DOCUMENTS

| | | | |
|---|---|---|---|
| 4,789,852 | 12/1988 | Bailey et al. | 341/50 |
| 5,301,304 | 4/1994 | Menon | 395/500 |
| 5,410,677 | 4/1995 | Roskowski et al. | 395/500 |
| 5,414,834 | 5/1995 | Alexander et al. | 395/600 |
| 5,446,896 | 8/1995 | Hegarty et al. | 395/650 |
| 5,530,794 | 6/1996 | Luebbert | 395/148 |
| 5,590,311 | 12/1996 | Matsushima | 395/500 |
| 5,608,874 | 3/1997 | Ogawa et al. | 395/200.15 |
| 5,617,432 | 4/1997 | Eggenberger et al. | 371/37.1 |

*Primary Examiner*—Thomas G. Black
*Assistant Examiner*—Jean R. Homere
*Attorney, Agent, or Firm*—Daniel J. Bourque; Kevin J. Carroll

[57] ABSTRACT

A system and method for automatically determining the file record format and characteristics for a data file of unknown file record format. At least a portion of an unknown file is obtained from a file source, such as a mainframe computer. At least a portion of the file is examined to determine whether the file is EBCDIC or ASCII encoded. File type, including print, card, text or binary, is determined. File headers and trailers are detected and removed. Line delimiters such as carriage return, linefeed or new line characters are detected. Periodic character patterns are searched for, such as a space followed by one or more numeric digits, to determine file record length and contents. Once the file record format is determined, a user may verify and modify the data. This system and method can be used by a data processing system, including a telephony system which accesses data records to determine parties in a database to contact, and automatically dial those parties.

27 Claims, 7 Drawing Sheets

FILE RUN 378669 ACMESPEEDSKATES 314159  ←30

| | 36 | 38 | 40 | 42 | 44 |
|---|---|---|---|---|---|
| 33a | 0003140 | DOE | JOHN | 3 MAIN STREET ANYTOWN VA | 2125551212 |
| 33b | 0003141 | ROE | JANE | 556 NORTH PENNSYLVANIA AVE BE | 6035551234 |
| | 0003142 | LIVINGSTON | JOHN | 33 CONGO PASS SMALLTOWN NJ | 4085555678 |
| | 0003143 | SIMON | SIMPLE | 12 BAKER'S COURT GOOSETOWN CA | 9155559012 |
| | | | | ... | |
| 33n | 0003199 | ZOMBIE | IMA | 13 BOURBON STREET WHARFTOWN LA 5125554321 | |

FILE END 378669 END END END END END ←34

| | | | | |
|---|---|---|---|---|
| 33a | 46a→ 0003140 | DOE | JOHN | 3 MAIN STREET ANYTOWN VA | 48a→ 2125551212 |
| 33b | 46b→ 0003141 | ROE | JANE | 556 NORTH PENNSYLVANIA AVE BE | 48b→ 6035551234 |
| 33c | 46c→ 0003142 | LIVINGSTON | JOHN | 33 CONGO PASS SMALLTOWN NJ | 48c→ 4085555678 |

Define Application

File: ▽ ATTCPG.txt

File Type: ▽ TEXT

Layout: EBCDIC

- Header/Trailer
- Truncated Spaces
- Unique Record Id
- Sequenced Records

Record Length: 155 △▽

(Load)

Time Zone Generation | Select A File | Process A File | Save

```
         40         50         60         70         80         90
.........|.........|.........|.........|.........|.........|
MOE'S FRIED CHICKEN           5678 FEATHER RD              LI58400033
BARNEY'S CONSTRUCTION INC     4 SANDS ST LOT 101           LI58400033
SOFT PRODUCTS                 45 PETAL STREET SUITE 12     LI61500059
JESSIE'S DRUG CENTER          60 FOX ST                    LI61500059
FIRST APOSTALIC               CHURCH                       LI55700057
CLYDE'S ONE HOUR CLNRS        22 HANGER RD                 LI60800033
ROCKY'S LANDSCAPES            73 GREEN RD                  LI58400033
THE BROTHERS CO DBA           RED BRICK APARTMENTS         LI59300031
DANCE PAR SCHL BD             LEARNERS SCHOOL              LI58400029
SPEEDY CLEANING BROS          52 WEST ST                   LI59700025
GARY'S AUTO SERVICE           33 SUNNY ST                  LI55600047
SWINGIN' SALLY DBA            CROWN TRANS SVC              LI62200054
COLONIAL                      BRENDA'S WAY                 FC62300053
CHURCH'S CHICKEN              ATTN JOE                     LI55Q0046
BUD'S PACKAGE & LIQUOR        24 BUBBLE PARK BLVD          LI61500045
STAR PETROLEUM OF FLA         BRAIN UNIVERSITY BLVD        FC58400038
ACME BRIGHT SIGNS             10 SESAME ST                 LI59700033
SHAR FISH                     97 NORTH ST                  LI59700032
FRIENDS' CHURCH               62 PEOPLE'S WAY              LI59700032
JULIE JONES SMITH             18 MOTOWN DRIVE              LI58100032
NAME                          ADDR1
```

Time Zone Generation

Tabs: Application | File Selection | File Processing | Save

Application Columns:
- Account Number
- Home Phone
- Work Phone
- Name
- Address Alias: Name
Length: 25
ADDR1
CHAR (25)

Import | Test/Build

| Name | Work Phone | Acct. No. |
|---|---|---|
| BONNIE PRATT | 510/427-1111 | 0000017159 |
| JESSIE HALL | 805/391-1111 | 0000002663 |
| SUSIE THOMAS | 209/636-1111 | 0000006630 |
| JOE PIC | 916/662-1111 | 0000017776 |
| FLOSSIE MOOR | 916/662-1111 | 0000599430LGA |
| CLYDE JONES | 209/577-1111 | 0000017357MICHA |
| ROCKY JAMES | 805/871-1111 | 0000006241AMELI |
| TOM SMITH | 707/464-1111 | 0000025975 |
| DAN DOE | 510/427-1111 | 0000028473KYLE |
| SANDY TOUPE | 000/000-1111 | 0000015068RAYMO |
| GARY JOHNSON | 000/000-1111 | 0000011861 |
| SALLY STREUSAL | 000/000-1111 | 0000028218 |
| NADINE TRUE | 209/526-1111 | 0000067243 |
| ALLEN JAKE | 000/000-1111 | 0000081044 |
| MOLLIE BAXTER | 000/000-1111 | 0000022163 |
| CHESTER EVANS | 707/442-1111 | 0000008881 |
| DINO OTTO | 000/000-1111 | 0000025309 |
| BRENDA STAR | 000/000-1111 | 0000012242 |
| OLIVIA BETZ | 209/924-1111 | 0000007636ROBER |
| SABRINA MOTZ | 209/582-1111 | 0000040470 |

| ACCT_NO | | PHONE_TN | BAL_DUE | ADDR1 |
|---|---|---|---|---|
| 0058349001154 | R | 5104274152 | 91.02 | BONNIE PRATT |
| 5482006647391 | R | 8053914822 | 72.60 | JESSIE HALL |
| 5493820011895 | R | 2096365427 | 61.06 | SUSIE THOMAS |
| 5269382755483 | R | 9166625597 | 47.01 | JOE PIC |
| 5422997015861 | R | 9166625412 | 38.58 | FLOSSIE MOOR |
| 5299770156728 | R | 2095778475 | 37.37 | CLYDE JONES |
| 5294831752408 | R | 8058715541 | 22.06 | ROCKY JAMES |
| 5488267418258 | R | 7074648812 | 51.56 | TOM SMITH |
| 5489524718593 | R | 5104278421 | 366.62 | DAN DOE |
| 5400588426743 | R | 5460002451 | 162.34 | SANDY TOUPE |
| 5422584106821 | R | 5541875942 | 43.02 | GARY JOHNSON |
| 5488992457126 | R | 5548924157 | 129.07 | SALLY STREUSAL |
| 5241005416824 | R | 2095845965 | 52.94 | NADINE TRUE |
| 5284265881452 | R | 4498245763 | 19.68 | ALLEN JAKE |
| 5267842158736 | R | 2214583647 | 58.42 | MOLLIE BAXTER |
| 5248521459632 | R | 7075892412 | 82.48 | CHESTER EVANS |
| 5498251147586 | R | 6478256123 | 40.16 | DINO OTTO |
| 5435002278541 | R | 2210450763 | 108.60 | BRENDA STAR |
| 5299485123745 | R | 2095428934 | 81.53 | OLIVIA BETZ |
| 5248517752684 | A | 2098954428 | 66.78 | SABRINA MOTZ |

Application Columns

ACCT_NO
Home
Business
ADDR1
ADDR2

Alias: ◇
Length: 10
PHONE_CBR
CHAR (10)

(Export)

FIG. 7

SYSTEM AND METHOD FOR DETERMINING AND VERIFYING A FILE RECORD FORMAT BASED UPON FILE CHARACTERISTICS

FIELD OF THE INVENTION

This invention relates to stored electronic data file records and more particularly, to a system and method for automatically determining file record format and characteristics of a data file.

BACKGROUND OF THE INVENTION

Computer databases have greatly improved business efficiency by allowing data records to be stored electronically and manipulated for various uses. One common use of computer databases is to store data records of customers or clients in a form which may be used for various purposes. Other computer systems, such as billing systems or telephony systems can then use the information stored in these databases.

File records are fixed or variable length records used to store information in a common pattern. For example, a file record for a consumer address includes generally a first field for the consumer's first name followed by subsequent fields for the consumer's last name, street address, state, zip code and telephone number. Each field may be a fixed length, or a variable length in which case any unnecessary spaces in the field are removed and field delimiters are present. A file database will consist of one or more of these standardized file records, plus often header information and file information which can come before and after the file records.

Since file records often store different kinds of information, the length of each file record can be different depending on the information to be stored. The file record could contain many hundreds of fields to store the different information in each file record or very few fields. Therefore, the file record length is determined by the requirements of the database and not by some standardized method.

A major problem with stored file records is the myriad of formats used for database files. There are hundreds of different computer systems in use by businesses from mainframes to notebook computers. Further, some business computer systems are still in use after 20 years. Although the information in the files may be kept current, the computer file systems and file record formats are old. Knowing all the possible file record formats for all the computer systems in use is simply impossible.

Determining the file record format of an unknown file generally requires an examination of the file to determine file record format. As the information is often stored in a character form, a person may examine the file and readily pick out a pattern to the data. However, as many hundreds of files may need examination, this is painstakingly slow and inefficient.

Accordingly, what is needed is a system for automatically determining file record formats, which can allow a system to automatically determine a file layout or format and proceed accordingly to divide file records into fields and select field information as needed for a given application.

SUMMARY OF THE INVENTION

This invention features a system and method for determining file characteristics for a file of undetermined file record format. At least a portion of a file containing a plurality of file records of undetermined file record format is obtained. File characteristics are determined, including EBCDIC or ASCII encoding, the presence of file headers or trailers, file record length, sequential record numbers, and the presence or absence of delimiting characters such as carriage return characters, linefeed characters, and new line characters.

The file type for the file of undetermined file record format is also determined, including files of the type "binary", "card", "text", and "print". If delimiting characters are not detected, the file type is determined to be a binary file type. If delimiting characters are detected at periodic sequences of 72–80 characters, the file type is determined to be a card file type. If delimiting characters are detected at periodic sequences of 128–132 characters, the file type is determined to be a print file type. If the file type is determined not to be binary, card or print file type, the file type is accordingly determined to be text file type.

If the file of undetermined file record format includes file headers and/or trailers, the file headers and trailers are removed. The removal can be performed by searching at the beginning of the file for a character string of the word "HEADER" subsequently followed by a carriage return character, and eliminating everything before that carriage return character. Another method is to simply skip a predetermined number of characters, such as 500 characters, at the beginning of the file.

The portion of the file of undetermined file record format is scanned to detect patterns common to each file record in the file. The file portion is scanned to attempt to find periodic repeating sequences of common characters. Patterns include one space followed by three numeric characters, one space followed by two numeric characters, and one space followed by a single numeric character. If this fails, then sequences of one space followed by one or more alphanumeric characters are searched for.

Once at least one pattern has been detected, the file portion is partitioned into file records. These file records can then be presented in a user-readable format, to allow a user to verify that the identification and partitioning is correct. The user may then further identify and label the various fields within each record. The file characteristics can be stored, or used immediately to decode the entire file.

DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENT

Figure 1:
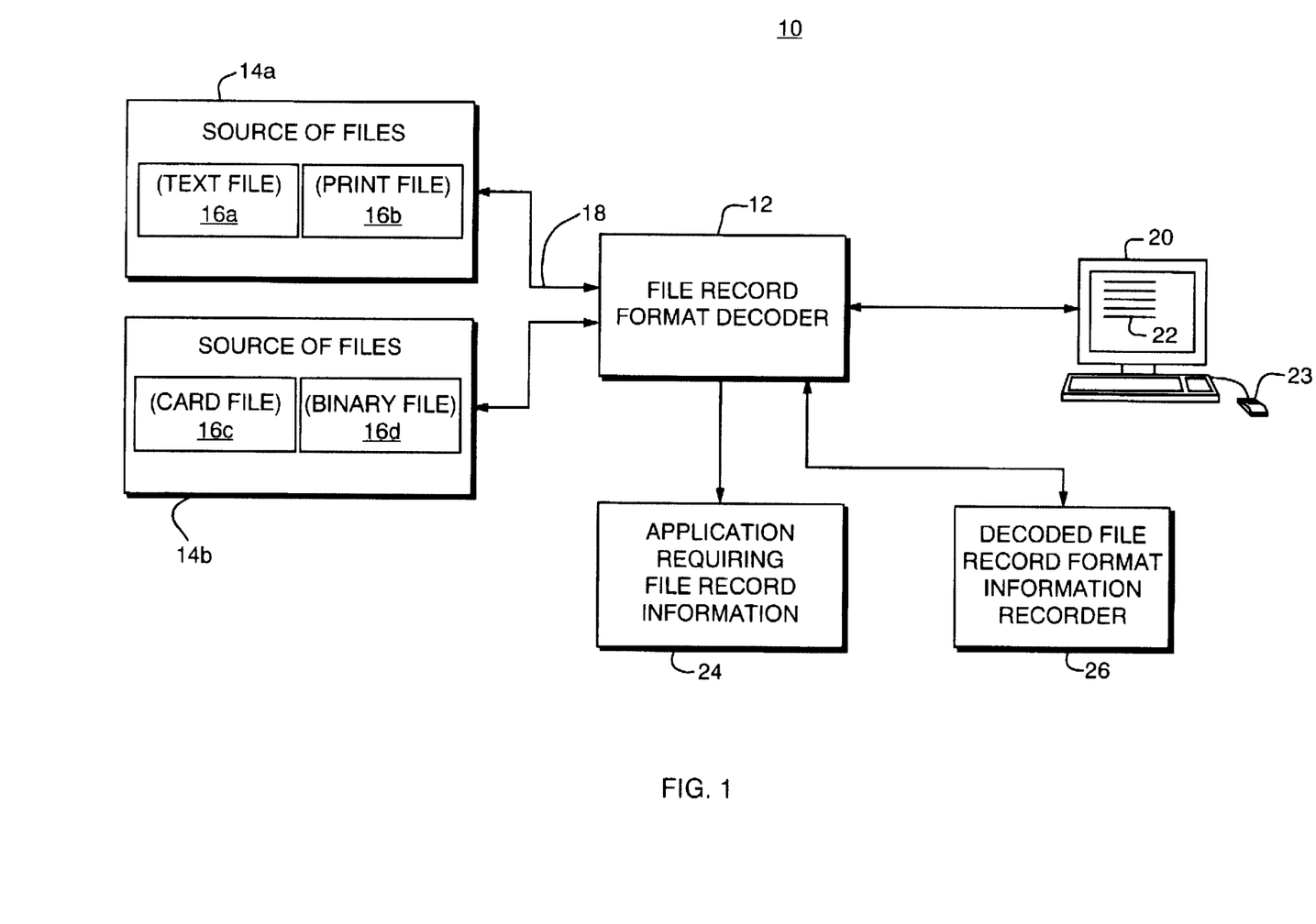
FIG. 1 is a block diagram showing a file record format decoder system according to the present invention.

The system for decoding file record formats 10, FIG. 1, according to the present invention is responsive to at least one source of files 14a, 14b which supply files 16 of undetermined record format. The source of files 14 is usually a computer database system, although other sources such as optically scanned documents are possible and within the scope of the present invention. File types for files of undetermined file record format include text files 16a, print files 16b, card files 16c which are usually stacks of computer data cards, or binary files 16d. Other file types are also possible.

The files of undetermined file record format 16 are partially or completely downloaded to the file record format decoder 12 over signal path 18. Signal path 18 may be any standard connection including ethernet, token ring, phone lines and modems, or other direct connect computer paths. In the preferred embodiment, file record format decoder 12 is a computer system running appropriate software for analyzing and processing files, such as a sun SPARC station.

File record format decoder 12 accepts at least the partial file of undetermined file record format 16 to process and to decode for applications requiring file record information 24 in a known format. Such applications 24 can include any information system which requires access to data stored in file records. One example of an application requiring file record information 24 is a DAVOX UNISON® Telephony System produced by Davox Corporation of Westford, Mass.

File record format decoder 12 decodes at least a portion of file 16 and then can display the partial file listing in a user-readable format, such as on a user work station 20. After the file record format decoder 12 attempts to decode the portion of file 16, the file 16 will be displayed in a lined up format 22, allowing a user to examine the file and decide whether the file 16 format decoding is correct or not. Further, the user may select and label certain fields in the file display 22, thus assisting the file record decoder 12 in processing the file 16.

Once file record format decoder 12 has decoded at least a portion of file 16 for test or evaluation purposes, the file record format decoder 12 obtains the rest of a file 16 from source of files 14. The entire file 16 can then be decoded and supplied to the application requiring file record information 24. File record format decoder 12 can also upload a decoded file 16 back to source of files 14 along signal path 18. File record format decoder 12 can also store the decoded file record format characteristics for that particular type of file 16 to a decoded file record format information recorder 26. This storage of decoding instructions allows file record format decoder 12 to know how to decode certain files 16, possibly coming from a common source of files 14.

Figure 2:
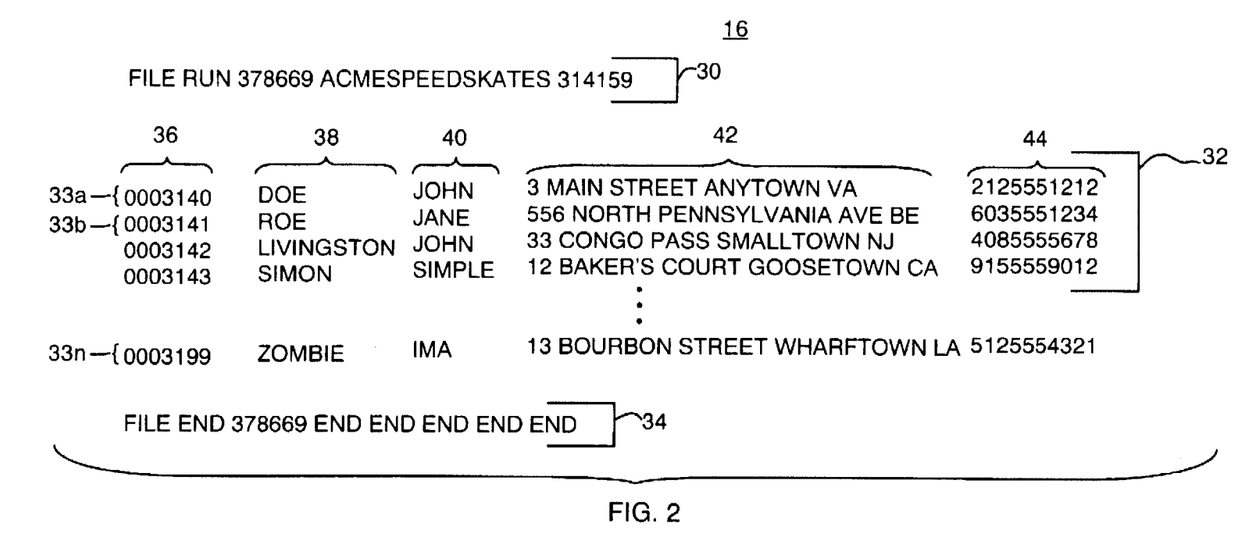
FIG. 2 is an example of a data file including a header, trailer and a plurality of file records divided into fields.

A typical file 16 such as a database file, FIG. 2 includes several different sections. File 16 can include a header 30 which contains information about the contents of file 16. After header 30 begins the main body 32 of file 16, which comprises one or more file records 33. File 16 can end with a trailer 34. Each of the file records 33 includes a number of different fields 36-44. Each of the fields 36-44 is designated to contain a predetermined data type for each record.

As an example, the first field of each file record 33 in main body 32 consists of record ID field 36. This record ID field 36 occupies the first seven characters (or bytes) of record 33. Immediately following the record ID field 36 is a last name field 38 for the last name of a person. Last name field 38 is fixed at eleven characters in this example. Immediately following last name field 38 is first name field 40. Street address field 42 is next, and contains 31 characters of a street address for the person. If the address takes up more space than allowed by street address field 42, the address is truncated. The last field in the record is telephone number field 44, which contains a dialable telephone number to reach the person.

File 16 represented in FIG. 2 is known as a fixed-length field file, in that each field 36-44 contains a predetermined, set number of characters per field. Should the data in the fields 36-44 take up less than the allotted number of characters, spaces are inserted to "pad out" the field. This padding guarantees that each field 36-44 and file record 33 in file 16 will be the same length.

An alternative to a full fixed-length file is a truncated space file in which one or more fields in one or more records (generally the last field in each record) does not include all the possible allocated characters in the truncated field if the characters are blank. Thus, a record in a truncated space field may vary in length up to a preset maximum limit.

Figure 4A:
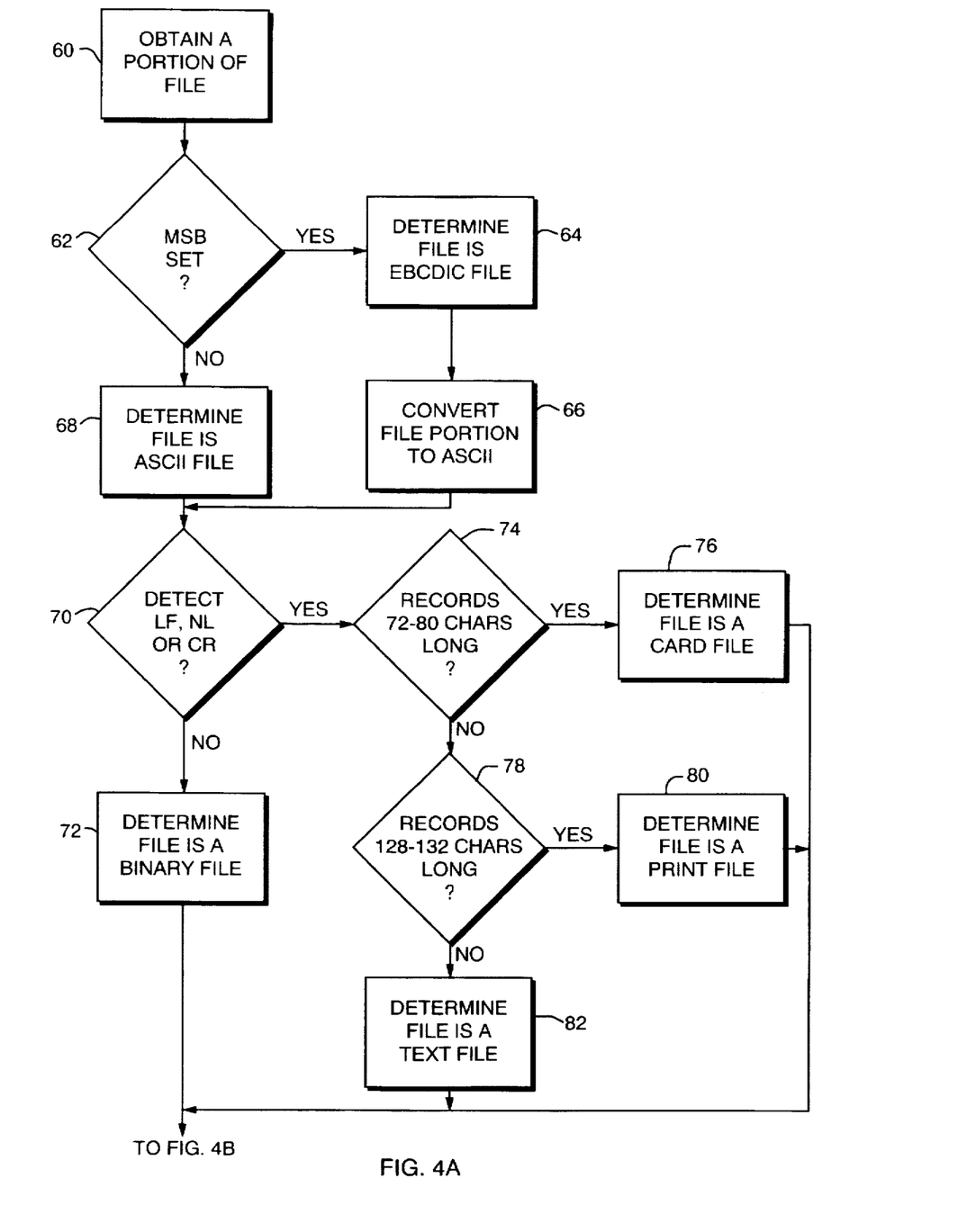
FIGS. 4A, 4B are flow diagrams showing the steps performed by one embodiment of the present invention.
Figure 4B:
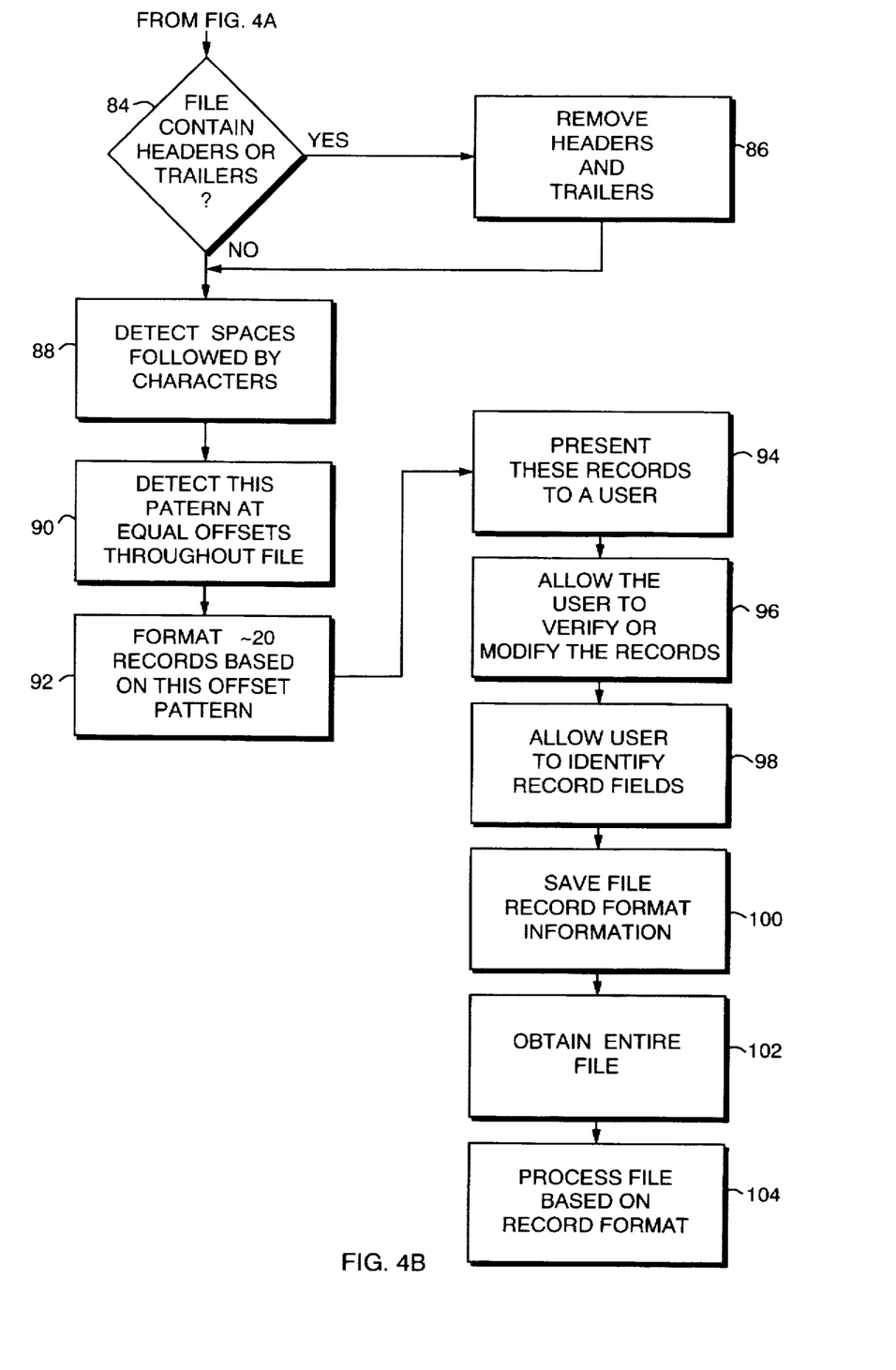

The steps performed by file record format decoder 12 in decoding a file 16 commences with obtaining a portion of the file 16, step 60 FIG. 4. Preferably, file record format decoder 12 should obtain enough of the file 16 to include at least four complete records 33.

Once a portion of a file 16 is obtained for analysis, the next step is to determine if the most significant bit (MSB) is set on each byte, step 62. If the most significant bit is set, this signifies that file 16 is in Extended Binary Coded Decimal Information Code (EBCDIC) format. EBCDIC file record encoding is usually found on old mainframe computers, while most modern computers use American Standard Code for Information Interchange (ASCII). If file 16 is EBCDIC encoded, the next step is to convert the file 16 to ASCII, step 66. Converting EBCDIC to ASCII is well known in the art, and can be performed by mathematical equations or lookup table.

If the most significant bit is not set as determined in step 62, file 16 is determined to be an ASCII encoded file, step 68. After this point, if file 16 portion was EBCDIC encoded, it is now ASCII encoded, and file 16 is subsequently processed as an ASCII encoded file. In ASCII files, one character takes up one byte.

The next step is to detect whether any linefeed, new line or carriage return characters are present in file 16, step 70. Linefeeds, new lines or carriage returns are standard characters usually used to delimit records within a file. Should file 16 not contain any linefeed, new line or carriage return characters, it is determined that file 16 is a binary file, step 72. Binary files tend to be more difficult to format, since there are usually no delimiters between the records.

Should file 16 contain such delimiting characters, the next step is to determine how long the individual file records 33 are. Since the delimiting characters separate records, if delimiting characters are spaced at periodic points (every 80 bytes for example), the record length of a file 16 can be readily determined. If the records 33 contain 72-80 (seventy-two to eighty) characters, step 74, file record format decoder 12 will determine that file 16 is a card file, step 76. This telltale size is because a computer card can fit a maximum of 80 (eighty) characters of data.

Should file 16 not contain records 33 up to 80 (eighty) characters long, the next step is to determine if the records 33 are 128-132 (one hundred twenty-eight to one hundred thirty-two) characters long, step 78. If this is true, file record format decoder 12 determines that file 16 is a print file, step 80. A print file is designated to be long enough to fit across a single line on a standard tractor feed printer. Such printers were once very common, including high speed daisy wheels and belt printers. Although such printers are less common these days, files tend to remain in whatever format the files were originally used in, so many files are still in a print file format.

Should file record format decoder 12 determine file 16 does not contain records which are 128–132 (one hundred twenty-eight to one hundred thirty-two) characters long, file record format decoder 12 determines that file 16 is a text file, step 72.

Although other file formats are possible, grouping into these four possible file formats, binary, card, print or text, provides a starting point for file format analysis. Other file formats are easily included in this invention by determining a range of record 33 sizes which correspond to the other file formats.

The next step is to determine whether file 16 contains headers or trailers, step 84. One method of determining if file 16 contains a header is to search the beginning of file 16 for the word "HEADER" immediately after a carriage return, new line or linefeed character. The word "HEADER" will usually be subsequently followed by another carriage return or a linefeed, which indicates the end of the header 30, FIG. 2. The header 30 can then be skipped over.

Another method to avoid or eliminate header information 30 is to simply skip the first 500 characters of the beginning of file 16. Analysis of file 16 begins after 500 characters, which generally guarantees that any header 30 at the beginning of file 16 will be skipped.

The steps to avoid processing of a trailer 34 of file 16 is similar, although if only a portion of file 16 has been downloaded, any trailer 34 or portion of trailer 34 may not be downloaded. If the entire file 16 has been downloaded for analysis, the analysis for a trailer 34 usually consists of a mirror image analysis as performed on the header 30. The file record format decoder 12 can check for carriage returns or linefeeds from the end of file 16, or limit analysis of file 16 to within 500 characters before the end of file 16.

At this point, file record format decoder 12 has determined a possible record length based on the periodic positioning of linefeed, new line or carriage return characters within file 16 if file 16 is a text, print or card file. If file 16 is a binary file, file records 33 and fields 36–44 are still detectable, as will be described below.

To continue the analysis, file record format decoder 12 attempts to detect patterns of characters which are matched up at periodic positions throughout file 16. For example, if a pattern of a space followed by the same three numbers is detected as shown by arrow 46 FIG. 3, at 100 (one hundred) or other similar character offsets throughout file 16, file record format decoder 12 determines that file records 33 are 100 characters long. This analysis will often take place immediately after a carriage return, new line or linefeed, since many records often start with a unique record identifier (ID), such as field 36, FIG. 2. Should a unique record ID or a standard record ID be discovered, as shown by arrow 46, FIG. 3 this pattern is determined to be a record ID field 36 throughout file 16.

Figure 3:
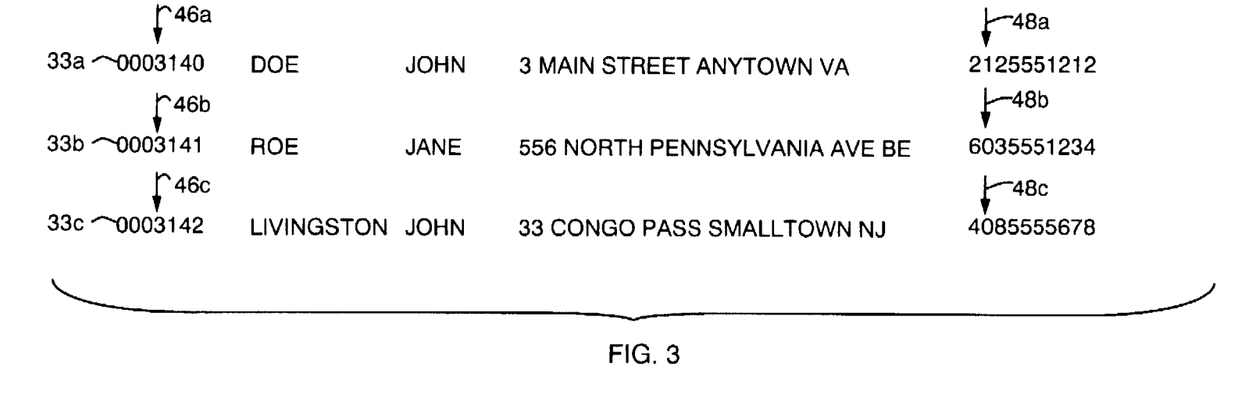
FIG. 3 is a detail of the data file of FIG. 2, showing how patterns are detected in the data file, according to the present invention.

As another example, file record format decoder 12 would detect three spaces followed by a numeric character, as shown by arrow 48, FIG. 3. Here, the numeric character is different in each record 33, however the pattern (three spaces and a numeric character) occurs at periodic offsets throughout the file 16. This pattern turns out to be the phone number field 44. In this example, if the file was a binary file with no delimiting characters, file record format decoder 12 would still detect the pattern of three spaces and a numeric character pattern, as shown by arrow 48. From this offset, file record format decoder 12 can then determine the length of records 33 in file 16.

In the preferred embodiment of the present invention, file record format decoder 16 commences pattern matching according to the following hierarchy shown in Table 1:

Table 1:

3 spaces followed by 2 numbers
2 spaces followed by 2 numbers
2 spaces followed by 1 number
2 spaces followed by 1 alphanumeric character The search algorithm gets more and more generic attempting to match patterns of characters.

Once an offset and a file record length is determined, the system can display a number of records 22 on a user display screen 20, allowing a user to verify whether the decoded file records 16 are correct or not. The presentation of the data to the user may be performed on a work station, such as workstation 20, FIG. 1 or printed to a printer or another means of presenting the data. The user then can visually ascertain that the decoded file record format (length) for file records 16 is correct, and can also mark certain file records as certain data, step 98.

Once file record information 16 is properly determined, the file format decoding information can be saved to a file, step 100. At this point, the entire file 16 can be downloaded from the source of files 14, and then processed in accordance with the saved file format decoding information, step 102 and 104. Now file 16 is formatted and data may be extracted from the fields 36–44 and used for the applications purpose.

Figure 5:
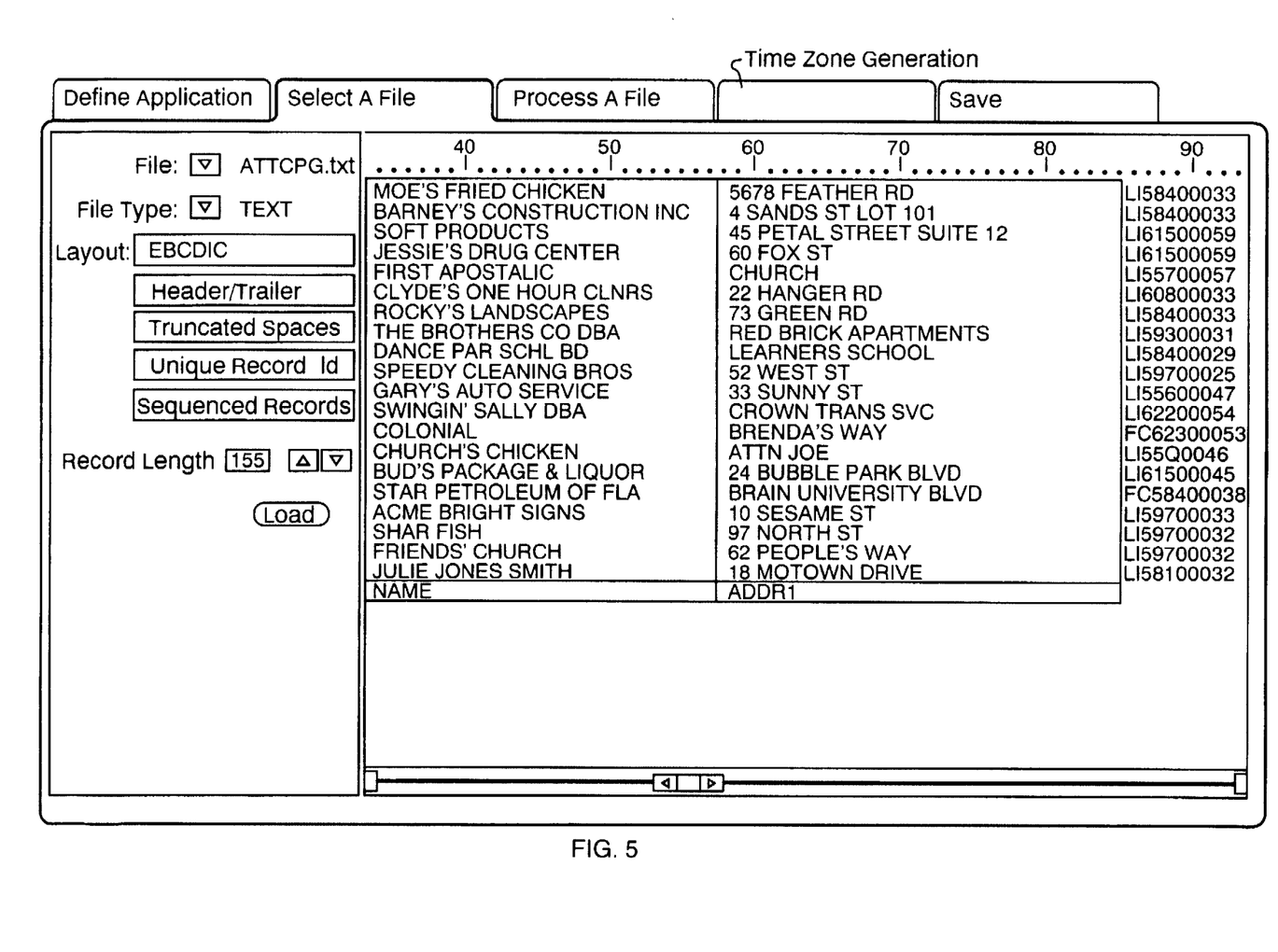
FIG. 5 is a sample display screen of a user interface for accessing file records formatted by one embodiment of the present invention.

A user display as shown on display system 20 can include various fields to allow a user to select data criteria or headings to be displayed, as shown in FIG. 5 which is a representative File Selection feature available from the Davox Unison call center system available from Davox Corporation, Westford Mass. and which is incorporated herein by reference. This feature allows the user to select a file to be imported and to determine the format in which that file will appear. The file format record decoder 12 of the present invention, for example the Unison call center management system, will automatically "guess" at, that is, attempt to determine the File Type, Layout, and Record Length of the imported file's data. The user may accept the format as determined by the file format record decoder 12 and click on the "load" icon to cause the system to process the file, or the user may modify the imported file's Type, Layout and/or Record Length.

Optionally, the user can select layout criteria, including EBCDIC, header/trailer, truncated spaces, unique record ID, and sequential records. This allows the user to select certain file format characteristics based on previous knowledge, or experiment to see which criteria helps to decode file 16. Further, the file record format decoder 12 of the present invention will select the data criteria automatically, since file record format decoder 12 automatically detects file characteristics such as EBCDIC, header/trailer, file record IDs, and sequential records.

Figure 6:
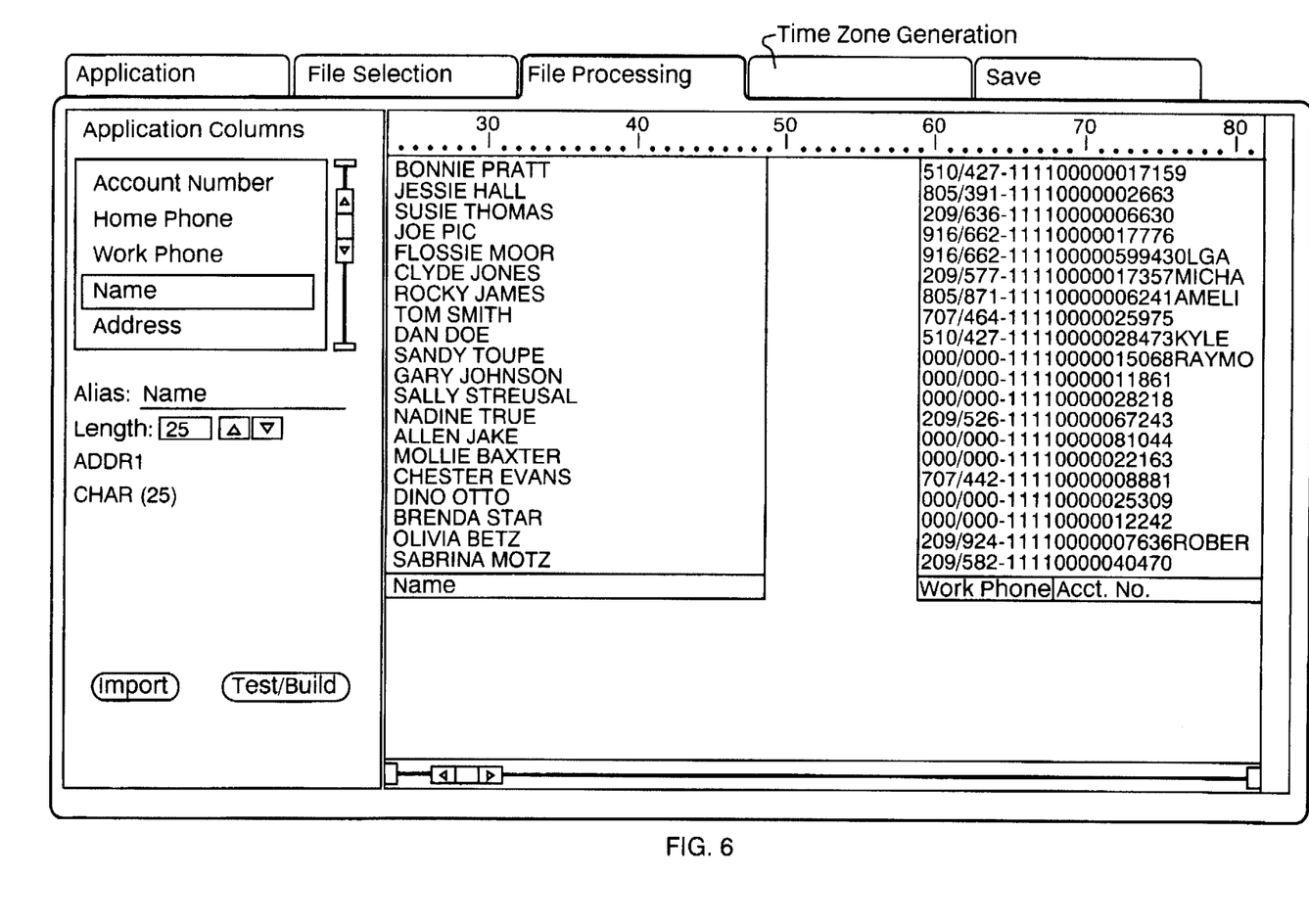
FIG. 6 is another sample display screen showing how a user can select and label fields.

A user may also select certain fields and label those fields as data, as shown in FIG. 6. The user may use a pointing device such as a mouse 23 FIG. 1, to select certain fields such as the name field, and mark the columns in the record which contain the name field. This allows the system 10 to mark and identify the data in those fields and to define the format of the import file by assigning appropriate application specific "Name Columns" thus defining certain data as a predetermined type of data field. Further, this information can be saved and used for other files which contain the same file record format.

Figure 7:
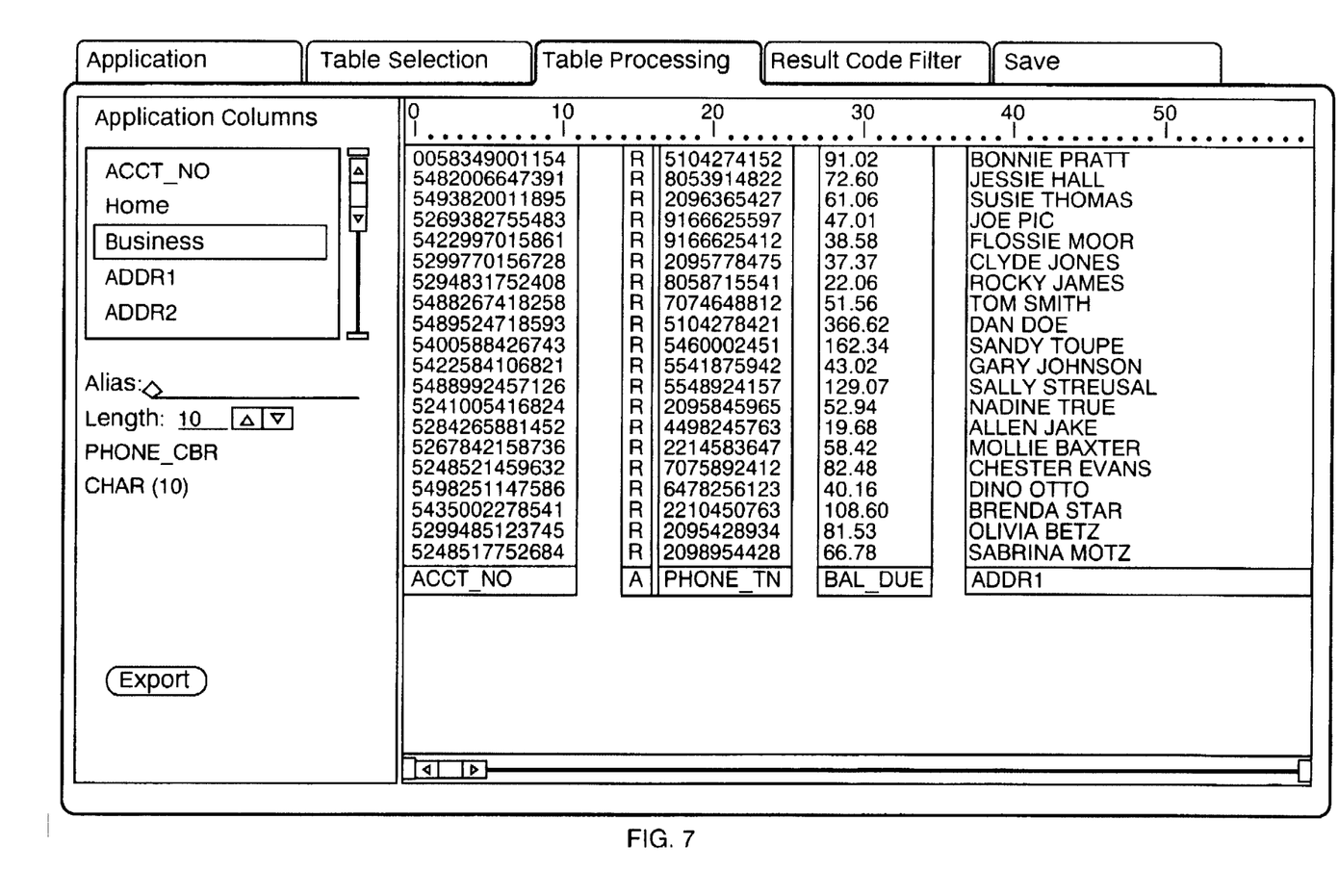
FIG. 7 is another screen display showing a sample data file divided into fields.

As shown in FIG. 7, other fields including account number and telephone number as well as balance due (for a credit account) can also be selected for file decoding and formatting. The present invention allows the user to determine the visual format of the table to be exported to a call center or automated dialer. The user may rename a field with an alias the better describes the contents of the field. The present invention will automatically select an appropriate record length which can, however, be overridden and shortened as desired by the user.

As a further example, a telephony system incorporating the present invention can download a file 16, decode the file format, process the file automatically and select accounts to be called based on the balance due field, and automatically dial the telephone numbers for those accounts found in the telephone number field. When a consumer is reached, the system will connect an agent to the consumer to talk about the bill. Thus, this invention helps completely automate the process of using files in any format for contacting clients, potential clients and other consumers.

Modifications and substitutions by one of ordinary skill in the art are considered to be within the scope of the present invention which is not to be limited except by the claims which follow.

What is claimed is:

1. A method for determining a file record format for a file of undetermined file record format, said method comprising the steps of:

obtaining at least a portion of said file of undetermined file record format, said file of undetermined file record format including a plurality of file records;

analyzing said at least a portion of said file of undetermined file record format, for determining at least one file characteristic of said file of undetermined file record format;

formatting at least one file record of said plurality of file records in said file of undetermined file record format based upon said at least one file characteristic determined by analyzing said at least a portion of said file of undetermined filed record format; and presenting at least one formatted file record of said plurality of file records to a user, for verifying said file record format.

2. The method of claim 1 wherein said at least one file characteristic is selected from the group consisting of:

file encoding, file type, presence of file headers and trailers, file record length, and sequential record numbers.

3. The method of claim 2 wherein said step of determining file encoding of said at least a portion of said file of undetermined file record format includes determining that file encoding is EBCDIC.

4. The method of claim 3 wherein, upon determining that file encoding of said at least a portion of said file of undetermined file record format is EBCDIC, the step of formatting said at least one file record includes converting file record encoding of said at least a portion of said file of undetermined file record format to an ASCII file encoding format.

5. The method of claim 2 wherein said step of determining file type of said file of undetermined file record format includes the step of determining that said file type of said at least a portion of said file of undetermined file record format is selected from the group of file types consisting of "binary", "card", "text" and "print" file types.

6. The method of claim 5 wherein said step of determining said file type of said file of undetermined file record format is one of "binary" includes detecting a lack of characters from the group consisting of carriage return characters, linefeed characters and new line characters.

7. The method of claim 6 wherein said step of determining said file type of said file of undetermined file record format includes the step of detecting periodic occurrence of characters from the group of characters consisting of carriage return characters, linefeed characters, and new line characters, at periodic sequences of between 72–80 characters; and determining that said file type is a "card" file type.

8. The method of claim 7 wherein said step of determining said file type of said file of undetermined file record format includes detecting periodic occurrence of characters from the group of characters consisting of carriage return characters, linefeed characters, and new line characters, at periodic sequences of between 128–132 characters; and determining that said file type is a "print" file type.

9. The method of claim 8 wherein said step of determining said file type of said file of undetermined file record format includes determining that said file type of said file of undetermined file record format is not one of "binary", "card", and "print"; and determining that said file type is a "text" file type.

10. The method of claim 2 wherein, upon determining the presence of file headers and footers the step of formatting said at least one file record includes removing file headers and footers from said file of undetermined file record format.

11. The method of claim 10 wherein said step of removing file headers include skipping a predetermined number of characters at the beginning of said at least a portion of said file of undetermined file record format.

12. The method of claim 10 wherein said step of removing file trailers include skipping a predetermined number of characters at the end of said at least a portion of said file of undetermined file record format.

13. The method of claim 10 wherein said step of removing file headers and trailers includes:

detecting a character string of "HEADER" subsequently followed by a carriage return character; and skipping to a point immediately after said carriage return character.

14. The method of claim 2 wherein said step of determining file record length of said file of undetermined file record length includes detecting periodic sequences of at least two characters in said file of undetermined file record format.

15. The method of claim 14 wherein said step of detecting periodic sequences of at least two characters in said file of undetermined file record format includes detecting a periodic repeating sequence of at least one space followed by at least one numeric character.

16. The method of claim 14 wherein said step of detecting periodic sequences of at least two characters in said file of undetermined file record format includes detecting a periodic repeating sequence of at least one space followed by at least two identical numeric characters.

17. The method of claim 14 wherein said step of detecting periodic sequences of at least two characters in said file of undetermined file record format includes detecting a periodic repeating sequence of at least one space followed by at least one alphanumeric character.

18. The method of claim 14 wherein, upon detecting periodic sequences of at least two characters in said file of undetermined file record format, the step of formatting said at least one file record includes partitioning said at least a portion of said file of undetermined file record format into records based on said periodic sequences of at least two characters.

19. The method of claim 1 further including, after the step of presenting at least one formatted file record of said plurality of file records, the step of:

responding to a user verification that said file record format of said at least one formatted file record presented to said user is correct.

20. The method of claim 19 further including, after the step of responding to a user verification, the step of:

formatting all of said plurality of file records of said file of undetermined file record format based on said file record format verified by said user.

21. The method of claim 19 further including, after the step of responding to a user verification, the step of:

storing said at least one file characteristic determined for said file of undetermined file record format.

22. The method of claim 1 further including, after the step of presenting at least one formatted file record to said user, the steps of:

changing said at least one file characteristic to a different file characteristic; and re-formatting said at least one formatted file record of said plurality of file records based upon said different file characteristic.

23. A system for determining a file record format for a file of undetermined file record format, comprising:

a file record format decoder, responsive to at least one source of at least one file of undetermined file record format for obtaining at least a portion of a file of undetermined file record format, said file record format decoder performing the steps of:

determining character coding of said at least a portion of said file of undetermined file record format;

determining file type of said at least a portion of said file of undetermined file record format;

removing, if present, headers and trailers in said at least a portion of said file of undetermined file record format; and detecting periodic sequences of at least two characters in said at least a portion of said file of undetermined file record format;

partitioning said at least a portion of said file of undetermined file record format into a plurality of records based on said periodic sequences of at least two characters; and outputting said partitioned at least a portion of said file of undetermined file record format to an output device.

24. A method for determining a file record format for a file of undetermined file record format comprising the steps of:

obtaining at least a portion of said file of undetermined file record format;

determining character coding of said at least a portion of said file of undetermined file record format;

determining a file type of said at least a portion of said file of undetermined file record format;

determining whether headers and trailers are present in said at least a portion of said file of undetermined file record format; and detecting periodic sequences of at least two characters in said at least a portion of said file of undetermined file record format.

25. The method of claim 24 further including the steps of:

formatting at least one file record of said plurality of file records in said file of undetermined file record format based upon said character coding, said file type, said headers and trailers, and said periodic sequences; and presenting at least one formatted file record of said plurality of file records to a user, for verifying said file record format.

26. The method of claim 25 further including, after the step of presenting at least one formatted file record, the steps of:

changing said at least one file characteristic to a different file characteristic; and re-formatting said at least one formatted file record of said plurality of file records based upon said different file characteristic.

27. A method for determining a file record format for a file of undetermined file record format, said file of undetermined file record format including a plurality of file records, said method comprising the steps of:

obtaining at least a portion of said file of undetermined file record format;

determining character coding of said at least a portion of said file of undetermined file record format, wherein said character coding includes one of EBCDIC and ASCII and, if said character coding is EBCDIC, converting said character coding to ASCII;

determining a file type of said at least a portion of said file of undetermined file record format, wherein said file type includes one of binary type, card type, print type, and text type;

determining whether headers and trailers are present in said at least a portion of said file of undetermined file record format and, if headers and trailers are present, removing said headers and trailers from said at least a portion of said file of undetermined file record format;

determining periodic sequences of at least two characters in said at least a portion of said file of undetermined file record format and, if periodic sequences of at least two characters are determined, partitioning said at least a portion of said file of undetermined file record format based upon said periodic sequences; and presenting said at least a portion of said file of undetermined file record format to a user, for verifying a format of said at least a portion of said file of undetermined file record format.

* * * * *